United States Patent
Caruk et al.

(10) Patent No.: US 9,213,355 B2
(45) Date of Patent: Dec. 15, 2015

(54) SELECTIVE INSERTION OF CLOCK MISMATCH COMPENSATION SYMBOLS IN SIGNAL TRANSMISSIONS BASED ON A RECEIVER'S COMPENSATION CAPABILITY

(71) Applicant: Advanced Micro Devices, Inc., Sunnyvale, CA (US)

(72) Inventors: Gordon F. Caruk, Brampton (CA); Gerald R. Talbot, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 444 days.

(21) Appl. No.: 13/670,086

(22) Filed: Nov. 6, 2012

(65) Prior Publication Data

US 2014/0129867 A1 May 8, 2014

(51) Int. Cl.
*G06F 1/00* (2006.01)
*G06F 5/06* (2006.01)
*H04L 7/00* (2006.01)
*H04L 7/04* (2006.01)

(52) U.S. Cl.
CPC ... *G06F 1/00* (2013.01); *G06F 5/06* (2013.01); *H04L 7/00* (2013.01); *H04L 7/005* (2013.01); *H04L 2007/045* (2013.01)

(58) Field of Classification Search
CPC .............. G06F 5/06; G06F 1/00; H04L 7/00; H04L 2007/045; H04L 7/005
See application file for complete search history.

(56) References Cited

U.S. PATENT DOCUMENTS

| 6,757,348 | B1 | 6/2004 | Vila et al. |
| 7,286,557 | B2* | 10/2007 | Feuerstraeter et al. ....... 370/465 |
| 7,599,459 | B2 | 10/2009 | Okuyama |
| 7,613,959 | B2 | 11/2009 | Tseng |
| 7,778,373 | B2 | 8/2010 | Kumar et al. |
| 8,285,884 | B1 | 10/2012 | Norrie |
| 8,352,773 | B2 | 1/2013 | Chuang et al. |
| 2007/0177701 | A1 | 8/2007 | Thanigasalam |
| 2008/0175586 | A1* | 7/2008 | Perkins et al. ..................... 398/2 |

(Continued)

FOREIGN PATENT DOCUMENTS

WO  2010036899 A1  4/2010

OTHER PUBLICATIONS

Reginald Conley, "PCIe Goes Clockless—Achieving Independent Spread-spectrum Clocking Without SSC Isolation", EE Times, <http://www.eetimes.com/document.asp?doc_id=1279744>, Jul. 5, 2012, 9 pages.

(Continued)

*Primary Examiner* — Thomas Lee
*Assistant Examiner* — Danny Chan

(57) ABSTRACT

In a system comprising a first device and a second device coupled via an interconnect, a method includes setting a rate of insertion of clock mismatch compensation symbols for a transmit port of the first device to one of a plurality of rates of insertion responsive to the second device having capability to compensate for a clock frequency mismatch. A device includes an interconnect interface comprising a transmit port and a receive port, and a configuration structure. The configuration structure comprises a capability field to store a value indicating whether the device has a capability to compensate for a clock frequency mismatch, and an enable field. The device further includes a packet control module to configure a rate of insertion of clock mismatch compensation symbols by the transmit port into a data stream responsive to a value stored at the enable field.

20 Claims, 4 Drawing Sheets

(56) References Cited

U.S. PATENT DOCUMENTS

| | | |
|---|---|---|
| 2008/0304415 A1 | 12/2008 | Cunningham |
| 2009/0086874 A1 | 4/2009 | Wang et al. |
| 2010/0080331 A1 | 4/2010 | Garudadri et al. |
| 2010/0315135 A1 | 12/2010 | Lai et al. |
| 2011/0113293 A1 | 5/2011 | Ikeda |
| 2011/0241749 A1 | 10/2011 | Kaviani et al. |
| 2011/0309948 A1 | 12/2011 | Montgomery et al. |
| 2012/0140781 A1 | 6/2012 | Green |
| 2013/0223552 A1 | 8/2013 | Okada |

OTHER PUBLICATIONS

International Search Report and Written Opinion correlating to PCT/CA2013/050845 dated Feb. 24, 2014, 7 pages.

Non-Final Office Action mailed Jan. 13, 2014 for U.S. Appl. No. 13/670,062, 11 pages.

U.S. Appl. No. 13/670,062, filed Nov. 6, 2012, entitled "Adaptive Clock Mismatch Compensation Symbol Insertion in Signal Transmissions".

Notice of Allowance mailed Jul. 10, 2014 for U.S. Appl. No. 13/670,062, 18 pages.

\* cited by examiner

SELECTIVE INSERTION OF CLOCK MISMATCH COMPENSATION SYMBOLS IN SIGNAL TRANSMISSIONS BASED ON A RECEIVER'S COMPENSATION CAPABILITY

CROSS-REFERENCE TO RELATED APPLICATIONS

The present disclosure is related to U.S. patent application Ser. No. 13/670,062 filed on even date herewith and entitled "Adaptive Clock Mismatch Compensation Symbol Insertion in Signal Transmissions," the entirety of which is incorporated by reference herein.

BACKGROUND

1. Field of the Disclosure

The present disclosure generally relates to transmitter interconnect interfaces and, more particularly, to clock mismatch compensation between a transmitter interconnect interface and a receiver interconnect interface.

2. Description of the Related Art

In many systems, the transmit side and receive side of an interconnect may operate using independent clock sources, which can introduce a frequency mismatch. To compound this problem, certain serial interconnect specifications, such as the Peripheral Component Interconnect Express (PCIe) specification, permit the use of spread spectrum clocking, and may permit multiple spread spectrum clock domains to be used in a system, which can result in an even greater clock mismatch in the event that one side is using spread spectrum clocking (SSC) and the other is not, or in the event that one side is in one spread spectrum clock domain and the other side is in a different spread spectrum clock domain. Many interconnect specifications attempt to address the potential for clock frequency mismatch by specifying the insertion of skip ordered sets into a transmitted datastream, such that the skip ordered sets can be dropped from the data stream or stored in an elastic buffer at the receive side so as to prevent buffer overflow/underflow. However, these specifications call for a fixed rate of insertion of skip ordered sets that reflects a worst-case frequency mismatch scenario, and thus waste interconnect bandwidth.

BRIEF DESCRIPTION OF THE DRAWINGS

The present disclosure may be better understood, and its numerous features and advantages made apparent to those skilled in the art by referencing the accompanying drawings. The use of the same reference numbers in different drawings indicates similar or identical items.

FIG. 5 is a flow diagram illustrating a method for designing and fabricating an integrated circuit device implementing at least a portion of an interconnect interface in accordance with some embodiments.

DETAILED DESCRIPTION

Figure 1:
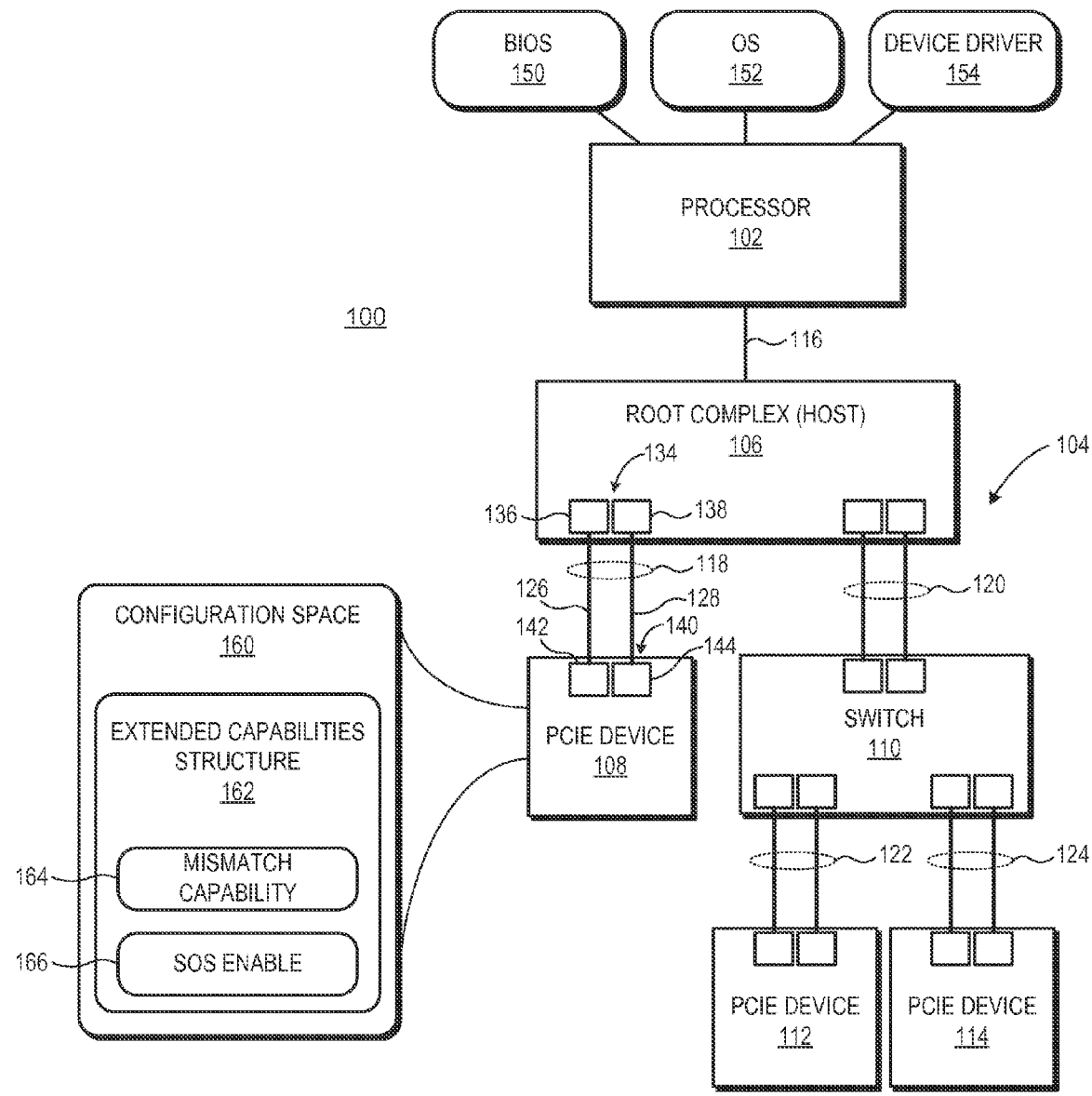
FIG. 1 is a block diagram illustrating a system employing selective reduction of a rate of insertion of clock mismatch compensation symbols in a data stream in accordance with some embodiments.

FIGS. 1-5 illustrate example techniques for selectively reducing the rate at which clock mismatch compensation symbols are inserted into a data stream based on an assessment of the capability of both the transmit-side device and the receive-side device to compensate for a mismatch between the frequency of the transmit-side clock and the frequency of the receive-side clock (referred to herein as the "clock frequency mismatch"). Generally, a clock frequency mismatch is manifested as a difference between the transmit-side bitrate and the receive-side bitrate (this difference being referred to herein as the "bitrate mismatch"). In some embodiments, a transmitting interconnect interface inserts clock mismatch compensation symbols into a transmitted data stream so as to allow the receiving interconnect interface to compensate for bitrate mismatch by either storing the clock mismatch compensation symbols in an elastic buffer to avoid buffer underflow, or by deleting the clock mismatch compensation symbols from the elastic buffer (or dropping them from the data stream) to avoid buffer overflow. In some interconnect interface specifications, the rate of insertion of clock mismatch compensation symbols (referred to herein as the "insertion rate") is fixed to a relatively high rate to compensate for worst-case scenarios, such as when the transmit-side and the receive-side are in separate spread spectrum clocking (SSC) domains. However, in implementations with less-pronounced bit rate differences, this high insertion rate causes the insertion of clock mismatch compensation symbols that are unnecessary for clock mismatch compensation purposes.

Accordingly, rather than fix the clock mismatch compensation symbol insertion rate to a fixed, high insertion rate, configuration software or another component of the system determines the capability of the receive port of at least one lane of an interconnect to compensate for a specified clock frequency mismatch without the use of clock mismatch compensation symbols inserted into the data stream. If the receive port has this capability, the component of the system configures the transmit port of that same lane to generate clock mismatch compensation symbols at a lower, more efficient insertion rate, or disable insertion of clock mismatch compensation symbols. This capability is referred to herein as a "mismatch compensation capability." A mismatch compensation capability may be enabled by a receive port through the use of certain clock mismatch compensation techniques, such as using a receive-side clock that is slightly faster than the transmit-side clock, or by performing 120b/130b decoding using the receive-side clock. In some embodiments, the mismatch compensation capability of a device may be indicated by a capability indicator set in the configuration register space of the device, and thus the mismatch compensation capability of a device can be assessed by accessing the capability indicators of the device's configuration space.

A receive port having a mismatch compensation capability for a clock frequency mismatch indicates that the receive port is capable of tolerating the bitrate mismatch that would result from the clock frequency mismatch in the absence of inserted clock mismatch compensation symbols, or at least the high rate of those symbols, in the data stream (that is, can operate in a manner that is not anticipated to result in one or both of elastic buffer overflow or elastic buffer underflow). In the event that the receive port has a mismatch compensation capability, the transmit port on the opposite end of the lane can be configured to disable insertion of clock mismatch compensation symbols (or be configured to a relatively low rate of insertion).

For example, the specified clock frequency mismatch could represent a maximum mismatch of +/−300 parts per million (ppm) of the specified clock frequency, and if the receive port has the mismatch compensation capability for this clock frequency mismatch, the opposing transmit port can be configured to disable insertion of clock mismatch compensation symbols into data streams transmitted to the receive port. Otherwise, if the receive port does not have this capability, the insertion rate of the transmit port can be set to a certain rate of insertion so as to permit the receive port to recover from the clock frequency mismatch through manipulation of inserted clock mismatch compensation symbols.

As another example, the PCIe specification also allows for spread spectrum clocking, which center-spreads or down-spreads the local clock signal using a modulation signal having a frequency of up to 33 kilohertz (kHz), with a resulting maximum mismatch requirement of +/−5000 ppm of the local clock frequency. Moreover, the PCIe specification permits the transmit side and receive side of a data stream to be clocked independently, that is, to have separate clock domains, particularly if the two sides are in different physical systems. Thus, for a data stream transmitted with both the transmit and receive sides each implementing spread spectrum clock signals in separate clock domains in accordance with the PCIe specification, the interconnect interface will need to tolerate an accuracy of at least +300/−5300 ppm. As with the previous example, if the receive port has the mismatch compensation capability for this clock frequency mismatch, the opposing transmit port can be configured to disable insertion of clock mismatch compensation symbols into data streams transmitted to the receive port. Otherwise, if the receive port does not have this capability, the insertion rate of the transmit port can be set to a certain rate of insertion so as to permit the receive port to recover from the clock frequency mismatch through manipulation of inserted clock mismatch compensation symbols.

By zeroing or otherwise reducing the insertion rate of clock mismatch compensation symbols in scenarios where the receive port of an interconnect can tolerate the resulting bitrate mismatch, the bandwidth penalty incurred by transmitting clock mismatch compensation symbols that are not necessary for receiver clock tolerance compensation can be reduced or avoided, thereby permitting more of the transmit bandwidth to be used for transmitting data.

The term "clock mismatch compensation symbol" refers to any set of one or more symbols or characters inserted into a data stream to facilitate receiver buffer overflow/underflow control due to clock frequency mismatch. For ease of illustration, the techniques of the present disclosure are described in an example context of skip ordered sets as clock mismatch compensation symbols. However, the disclosed techniques can be implemented with any of a variety of clock mismatch compensation symbols, and thus reference herein to "skip ordered sets" applies to other types of clock mismatch compensation symbols unless otherwise noted. Moreover, although the techniques of the present disclosure are described primarily in the example context of a Peripheral Component Interconnect Express (PCIe)-based serial interconnect, these techniques can be employed in transmission systems compatible with any of a variety of interconnect specifications that employ skip ordered sets or other clock mismatch compensation symbols for receiver clock tolerance compensation, such as the Universal Serial Bus specifications, the DisplayPort specifications, the Thunderbolt specifications, the Serial ATA (SATA) specifications, and the Infiniband specifications.

Moreover, although techniques are described in the example context of serial interconnects and serial transmissions for ease of illustration, these techniques are not limited to serial transmission systems, but instead may be implemented in any of a variety of serial or parallel transmission systems in which the receive-side interconnect can obtain or infer a representation of the clock frequency of the transmit-side interconnect, either directly (e.g., with a forwarded clock) or indirectly (e.g., via clock recovery). Accordingly, unless otherwise noted, reference to "serial" applies equally to "parallel."

FIG. 1 illustrates a data processing system 100 employing selective skip ordered set (SOS) insertion in accordance with some embodiments. The data processing system 100 includes one or more processors 102 coupled to an interconnect fabric 104, such as a PCIe interconnect fabric. The interconnect fabric 104 includes a root complex 106 coupled directly or indirectly to one or more devices, such as devices 108, 110, 112, and 114 (collectively, "devices 108-114"). The root complex 106 generates transaction requests on behalf of the processor 102, which is interconnected through a local bus 116. The root complex 106 may be implemented as a discrete device (e.g., a southbridge or other chipset), or may be integrated with the processor 102 (e.g., as an integrated northbridge). In the illustrated example, the device 108 is an end device coupled directly to the root complex 106 via an interconnect 118 (e.g., a PCIe link), and the devices 112 and 114 connect via interconnects 122 and 124, respectively, to the device 110, which in turn is connected to the root complex 106 via an interconnect 120. Thus, the device 110 operates as a switch in this scenario, and therefore is referred to herein as "switch 110." Although FIG. 1 illustrates a two-level interconnect fabric, it will be appreciated one level or more than two levels alternatively could be employed in other implementations.

The devices 108-114 can include any of a variety of devices that communicate information via data streams, such as central processing units (CPUs), graphical processing units (GPUs) and other processors, or peripheral components, such as add-on boards, storage devices, and the like. The interconnects 118, 120, 122, and 124 (collectively, "interconnects 118-124") can include any of a variety of serial or parallel interconnects that utilize skip ordered sets or other types of clock mismatch compensation symbols to facilitate clock mismatch compensation, such as interconnects compliant with one or more of the Peripheral Component Interconnect Express (PCIe) specifications, one or more of the Universal Serial Bus (USB) specifications, one or more of the Infiniband specifications, one or more of the DisplayPort specifications, one or more of the Thunderbolt specifications, one or more of the Serial ATA (SATA) specifications, and the like. For example, the processor 102 and root complex 106 could be implemented on a motherboard and the devices 108-114 could include add-on boards, flash memory devices, or other peripheral components connected to the motherboard via a PCIe expansion slot. As another example, the devices 108-114 can include field replaceable units (FRUs) or server blades connected via a PCIe-based backplane (one embodiment of an interconnect). As yet another example, the processor 102 and the root complex host 106 could be implemented in a notebook computer and one of the devices 108-114 could include a flash storage device, and the interconnect connecting the notebook computer and the flash storage device could comprise a USB 3.0 cable.

Each of the devices of the interconnect fabric 104 is connected to at least one interconnect via at least one transmit port and at least one receive port. The interconnect includes one or more links, with each link comprising two sets of lanes. One set of lanes is used to transit a data stream in one direction and the second set of lanes is used to transmit a data stream in the opposite direction. The transmit side of a lane is connected to a transmit port of one device and the receive side of the lane is connected to the receive port of the opposite device. For example, the interconnect 118 includes a link comprising lanes 126 and 128, the root complex 106 includes an interconnect interface 134 comprising a transmit port 136 connected to the lane 126 and a receive port 138 connected to the lane 128, and the device 108 comprises an interconnect interface 140 comprising a receive port 142 connected to the lane 126 and a transmit port 144 connected to the lane 128.

In some embodiments, the transmit port of one device uses a transmit clock signal based on a local clock signal to transmit a data stream via a lane, whereas the receive port at the device at the opposite end of the lane uses a receive clock signal based on a local clock signal to process the data stream once received. Ideally, the local clock signals used by the devices at the opposite ends of a lane would have the exact same frequency and thus be perfectly synchronized. However, in practical applications, there typically is a non-trivial clock frequency mismatch between the transmit side and the receive side of an interconnect due to both physical limitations in the clock signal sources, as well as the use of certain techniques, such as spread spectrum clocking. The PCIe specification provides that, in the absence of spread spectrum clocking, the local clock signals used by the PCIe hosts should be 100 megahertz (MHz) with an maximum mismatch of +/−300 ppm of the local clock frequency. However, the PCIe specification also allows for spread spectrum clocking, which center-spreads or down-spreads the local clock signal using a modulation signal having a frequency of up to 33 kilohertz (kHz), with a resulting maximum mismatch requirement of +/−5000 ppm of the local clock frequency. Moreover, the PCIe specification permits the transmit side and receive side of a data stream to be clocked independently, that is, to have separate clock domains, particularly if the two sides are in different physical systems. Thus, for a data stream transmitted with both the transmit and receive sides each implementing spread spectrum clocking (SSC) in separate clock domains, the interconnect interface will need to tolerate accuracy maximum mismatch of at least 5600 ppm (+300/−5300 ppm) since the slower clock signal can be on either side of the link.

In view of the potential for clock frequency mismatch, and thus the potential for differences between the bitrate of data being processed at the transmit port and the bitrate of data being processed at the receive port, the transmit ports of the interconnect interfaces of the devices 108-114 can be configured to insert skip ordered sets into their respective transmitted data streams at a specified rate so as to allow the receive ports on the opposite ends of the interconnects to compensate for clock frequency mismatches. This compensation can include storing skip ordered symbols in addition to the received skip ordered sets in the elastic buffer of the receive port to prevent buffer underflow when the receive-side clock frequency is greater than the transmit-side clock frequency. This compensation alternatively can include deleting skip ordered sets from the elastic buffer, or otherwise deleting them from the data stream, to prevent buffer overflow when the transmit-side bitrate is greater than the receive-side bitrate.

Conventional interconnect interfaces typically fix the SOS insertion rate to accommodate a worst-case scenario for clock frequency mismatch. To illustrate, in light of the worst-case scenario of a clock frequency mismatch of 5600 ppm due to separate SSC domains, the PCIe specification calls for a skip ordered set to be inserted into the transmitted data stream every 154 symbols on a packet boundary, and thus requiring dedication of 2-5% of the lane bandwidth to the transmission of skip ordered sets. However, in the event that the transmit side and the receive side are in a common clock domain (that is, clocked by the same clock signal or by clock signals referenced to the same source clock signal or by clock signals within +/−300 ppm of each other), the clock frequency mismatch is likely to be +/−300 ppm or less. As such, fixing the SOS insertion rate to the rate needed to handle a worst-case scenario leads to wasted bandwidth in situations exhibiting a better-than-worst-case clock frequency mismatch.

Moreover, the devices connected via an interconnect may be capable of tolerating certain bitrate differences, and thus it may be unnecessary to insert skip ordered sets at any rate. For example, the receive ports of a device may be able to compensate for a specified bitrate difference using any of a variety of clock frequency mismatch compensation techniques, such as by using a clock signal at the receive port that is slightly faster than the clock signal used at the opposing transmit port, or by performing the 8b/10b decoding or 128b/130b decoding in the receive clock domain, as described in greater detail below. In such instances, the opposing transmit port can be configured to disable SOS insertion entirely with respect to the interconnect. Alternatively, SOS insertion may be set to a relatively low rate.

To reduce or eliminate unnecessary SOS insertion, and thus free up bandwidth for data transmission, mismatch compensation capabilities of the devices in the interconnect fabric 104 to tolerate a specified bitrate difference are assessed and the SOS insertion rates of the transmit ports of the devices are configured accordingly. In some embodiments, this assessment is performed by configuration software executed by the processor 102 as part of, for example, a configuration process of a basic input/output system (BIOS) 150 or other boot-up process, as part of a configuration process implemented by an operating system 152, or as part of a configuration process implemented by a device driver 154, such as the device driver for the root complex 106.

The mismatch compensation capability of a receive port of a device can be determined from configuration data or a configuration indicator associated with the device. For example, in some embodiments, each device implements a configuration space for the device's configuration register set (such as configuration space 160 for device 108), whereby the fields of the configuration space are accessible to another device, such as the root complex 106 or a memory controller. To illustrate, the PCIe specification provides that each PCIe-compliant device is to provide a configuration space implemented as a 4-kilobyte memory-mapped register set. The first 256 bytes of the PCIe configuration space includes a PCI-compatible configuration space that provides basic configuration information for the PCIe device. After the first 256 bytes, the PCIe configuration space can implement an extended capabilities structure, such as extended capabilities structure 162 of the configuration space 160, whereby the extended capabilities structure 162 can include a linked list or other data structure of fields that provide information regarding the capabilities of functions of the corresponding device.

To this end, in some embodiments, the extended capabilities structure 162 of the configuration space 160 of a device can be used to indicate the device's ability to tolerate a particular clock frequency mismatch. For example, the extended capabilities structure 162 can include a mismatch capability field 164 to store a mismatch capability indicator representing a mismatch compensation capability, whereby one value (e.g., "00") stored as the indicator identifies the device as being incapable of compensating for or otherwise tolerating the specified clock frequency mismatch without the high rate of SOS insertion. Another value (e.g., "10") stored as the indicator identifies the device as being capable of compensating for or otherwise tolerating the specified clock frequency mismatch with a low rate of SOS insertion. A third value (e.g., "11") stored as the indicator identifies the device as being capable of compensating for or otherwise tolerating the specified clock frequency mismatch without any SOS insertion. In the event that there are multiple specified clock frequency mismatches to consider, the extended capabilities structure 162 can employ a different mismatch capability field 164 for each clock frequency mismatch, or the value stored at the mismatch capability field 164 can indicate the maximum clock frequency mismatch that can be tolerated by the device in the absence of SOS insertion for a received data stream.

The mismatch capability field 164 can be configured at the time of manufacture of the corresponding device, during an initial integration into a system (such as by an original equipment manufacturer (OEM) when building a computing system using the device), dynamically during operation, and the like. For example, if the device implements a hardwired clock frequency mismatch compensation mechanism that is always enabled, the mismatch capability field 164 could be programmed at the time of manufacture by, for example, programming one or more fuses, so as to reflect the permanent nature of this capability. Alternatively, if the clock frequency mismatch compensation mechanism can be enabled or disabled dynamically, the mismatch capability field 164 may be dynamically changed based on the enabled/disabled state of the mechanism. As yet another example, if a clock frequency mismatch compensation mechanism is implemented as part of, for example, a firmware update to the device, the mismatch capability field 164 may be set during the firmware update execution.

In some embodiments, the configuration space 160 further includes an SOS bypass enable field 166, whereby the value stored at the SOS bypass enable field 166 controls the SOS insertion rate employed by the corresponding device. For example, the SOS bypass enable field 166 can enable two levels: an SOS insertion rate of 1538 symbols on a packet boundary (that is, a low rate of SOS insertion) or an SOS insertion rate of, for example, every 154 symbols on a packet boundary (that is, a high rate of SOS insertion). In other embodiments, the SOS bypass enable field 166 can enabled three or more levels, such as an SOS insertion rate of zero (SOS insertion disabled or bypassed), a low SOS insertion rate of, for example, 154 symbols on a packet boundary, and a high SOS insertion rate of, for example, 1538 symbols on a packet boundary. The SOS bypass enable field 166 may control all of the transmit ports of the device such that the same insertion rate is employed for each transmit port, or each link or subset of multiple links may have a separate SOS bypass enable field 166 enabling a separate SOS insertion rate to be set depending on the capabilities of the devices on the opposing sides of the interconnects.

Figure 2:
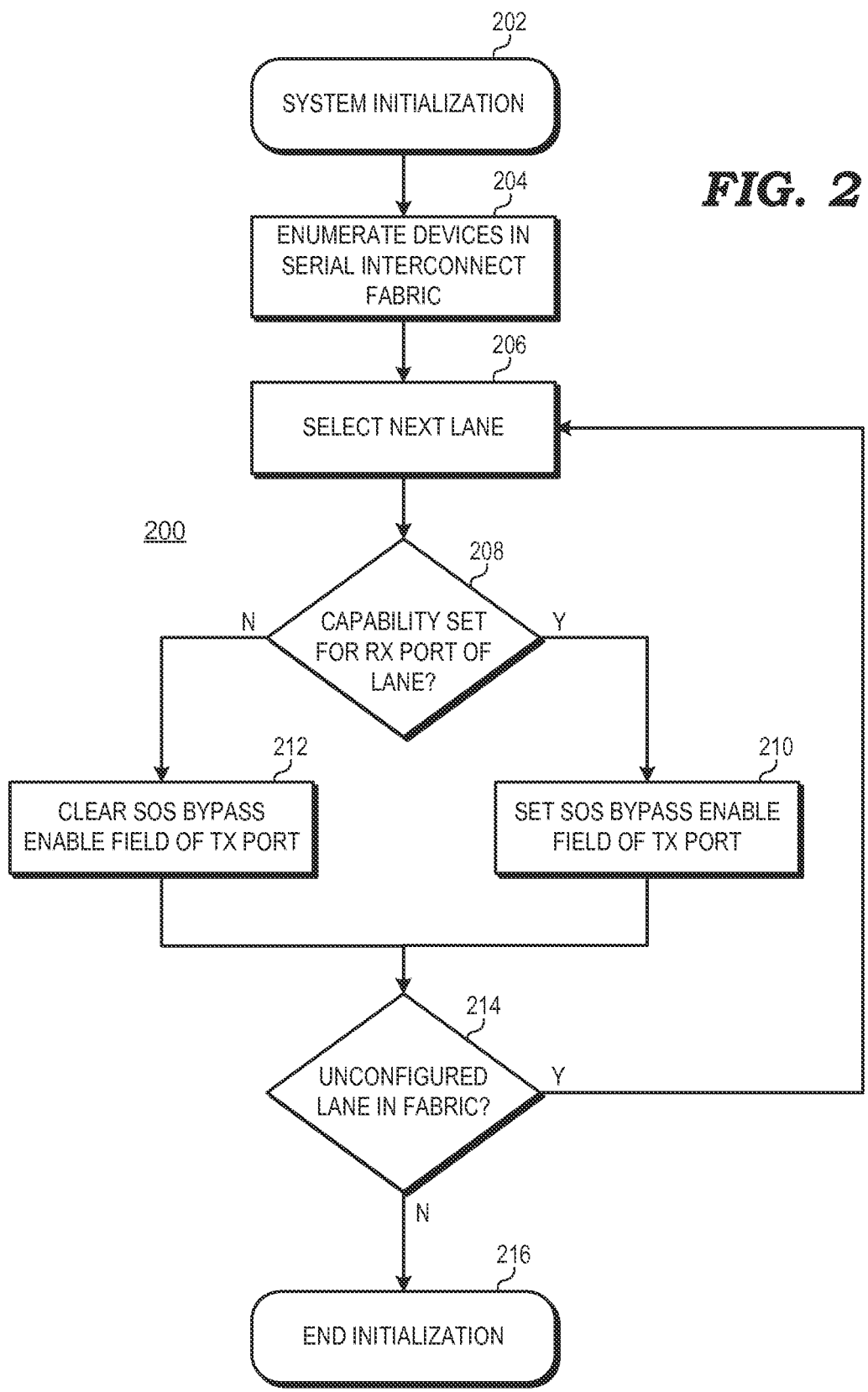
FIG. 2 is a flow diagram illustrating a method for selective reduction of a rate of insertion of clock mismatch compensation symbols in a data stream in accordance with some embodiments.

FIG. 2 illustrates an example method 200 of selective SOS insertion for interconnects of the data processing system 100 of FIG. 1 in accordance with some embodiments. At block 202, the data processing system 100 begins a system initialization process. The initialization process can be performed as part of, for example, a BIOS initialization, initial configuration of an operating system, a device initialization in response to a hot-swap event, and the like. As part of this initialization, configuration software executed by the processor 102 performs, at block 204, an enumeration process to enumerate, or identify, the devices present in the interconnect fabric 104, and to identify their particular configurations and capabilities using any of a variety of well-known enumeration techniques.

During or after the enumeration process, the configuration software proceeds to configure the SOS insertion rates for the transmit ports of the devices. Accordingly, at block 206, the configuration software selects one of the interconnects identified during the enumeration process, and selects one of the lanes of the selected interconnect. At block 208, the configuration software determines whether the device having the receive port connected to the selected lane has a mismatch compensation capability for a specified clock frequency mismatch. In one embodiment, this determination can be made by accessing the mismatch tolerance indicator for the device, either from the mismatch capability field 164 of the device's configuration space 160, or from a local cache of the mismatch tolerance indicators for the devices of the interconnect fabric 104.

In the event that the mismatch tolerance indicator for the device indicates the receive port has the mismatch compensation capability, at block 210 the configuration software sets the SOS bypass enable field 166 for the transmit port at the opposing end of the selected lane so as to configure the transmit-side device to disable SOS insertion (or to implement a relatively low SOS insertion rate) as SOS insertion would be unnecessary in order for the receive port to reliably receive a signal transmission between the two devices. Returning to block 208, in the event that mismatch tolerance indicator for the device indicates that the receive port does not have the mismatch compensation capability, at block 212 the configuration software clears the SOS bypass enable field 166 of the transmit port on the lane. That is, since it is the device receiving a data stream that generally must compensate for any clock frequency mismatches between transmit-side and receive-side, if the receive-side device is incapable of compensating for a specified clock frequency mismatch, the configuration software configures the transmit-side device to implement a higher SOS insertion rate to compensate for this incapability in the receive-side device. Thus, if both devices are incapable of compensating for the specified bit rate mismatch, the transmit ports of both devices are configured to implement the higher SOS insertion rate for the corresponding interconnect.

Although the SOS insertion rate may be configured on a lane-by-lane basis as described above, in other embodiments the SOS insertion rate is configured on an interconnect-by-interconnect basis. In this instance, if both devices connected via an interconnect have mismatch compensation capabilities, the configuration software disables SOS insertion at both sides. However, if the configuration software determines at least one of the devices does not have a mismatch compensation capability, the configuration software configures the transmit ports on both sides to enable SOS insertion.

After selectively configuring the SOS insertion for the selected lane, at block 214 the configuration software determines whether any other lanes of any interconnect have yet to be configured. If so, the method 200 returns to block 206, whereupon the next unconfigured lane is selected for configuration and the process of blocks 208-212 is repeated for the next selected lane. Otherwise, the method 200 turns to block 216, whereupon the configuration software completes the initialization process and enables the use of the devices of the interconnect fabric 104 by the components of the data processing system 100.

Figure 3:
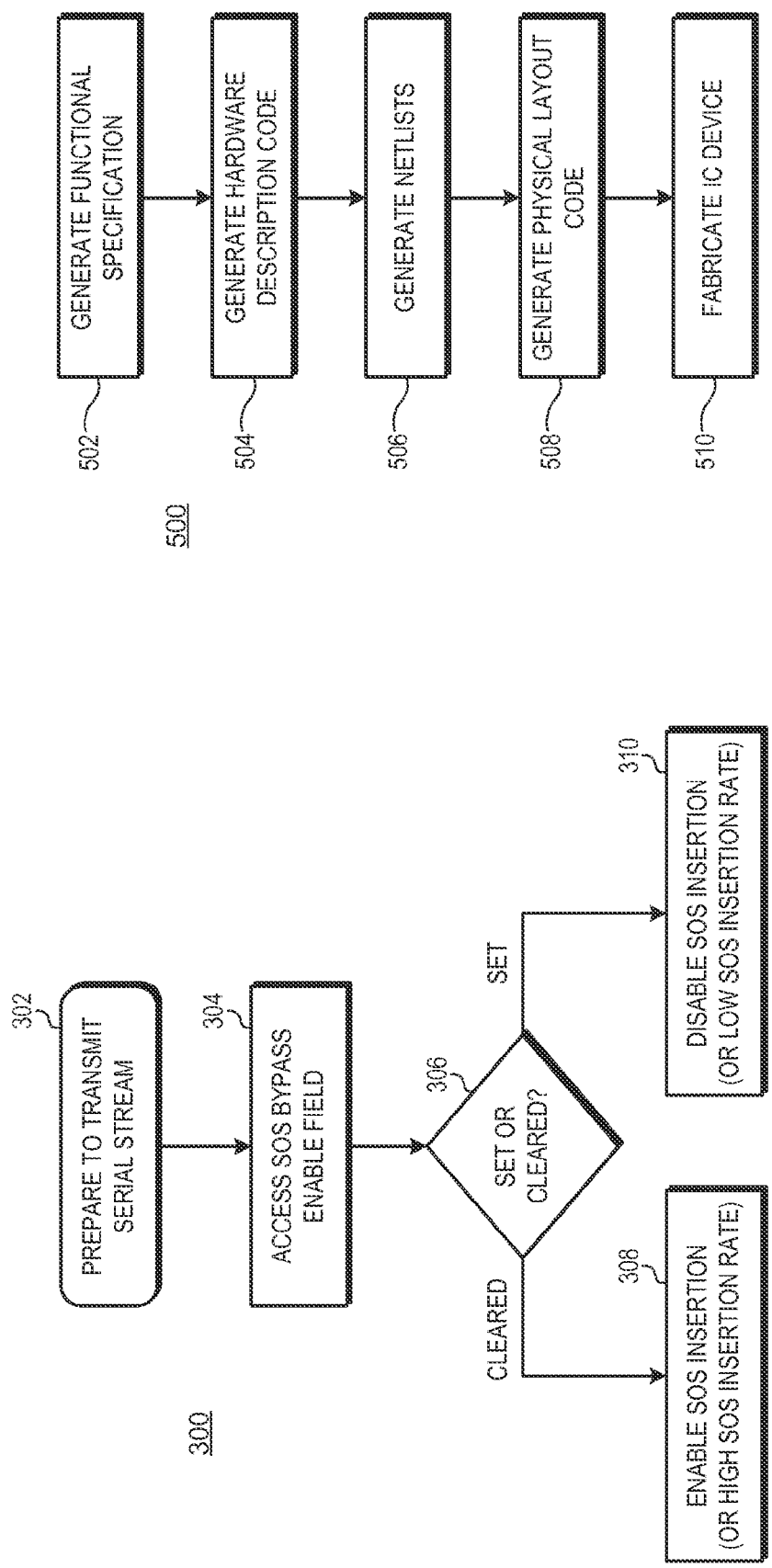
FIG. 3 is a flow diagram illustrating a method for configuring a transmit port of an interconnect interface to insert clock mismatch compensation symbols into a data stream in accordance with some embodiments.

FIG. 3 illustrates an example method 300 of data steam transmission using selective SOS insertion in accordance with some embodiments. The method 300 initiates at block 302, whereupon a device prepares to transmit a data stream via a transmit port of an interconnect. In response, at block 304 the transmit port of the device accesses the bypass indicator stored in the SOS bypass enable field 166. In the example of FIG. 3, the bypass indicator being "set" (e.g., having a "1" value) indicates that SOS insertion is to be bypassed or otherwise disabled (or set to a relatively low insertion rate), whereas a bypass indicator being "cleared" (e.g., having a "0" value) indicates that SOS insertion is to be enabled (or set to a relatively high insertion rate). Accordingly, at block 306, the device determines whether the bypass indicator is set or cleared. If the bypass indicator is cleared, at block 308 the device configures its transmit port to enable SOS insertion into the data stream (or sets the SOS insertion rate to a higher insertion rate). Otherwise, if the bypass indicator is set, at block 310 the device configures its transmit port to disable SOS insertion into the data stream (or sets the SOS insertion rate to a lower insertion rate).

Figure 4:
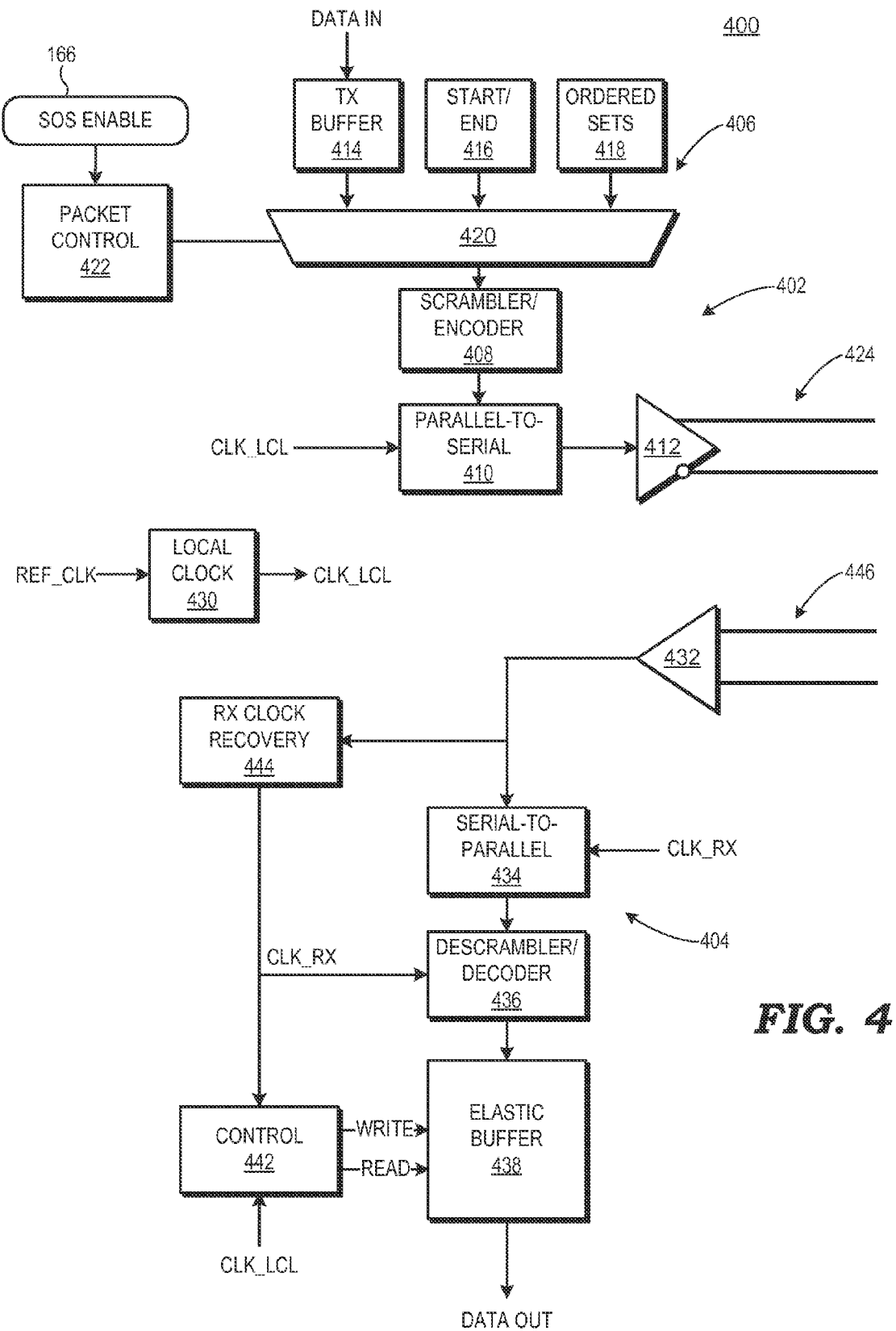
FIG. 4 is a diagram illustrating an interconnect interface having a configurable clock mismatch compensation symbol insertion rate in accordance with some embodiments.

FIG. 4 illustrates an example of a device's interconnect interface 400 for implementing SOS insertion rate configuration for an interconnect in accordance with some embodiments. In the depicted example, the interconnect interface 400 includes a transmit port 402 and a receive port 404. The transmit port 402 includes a packet stream generator 406, a scrambler/encoder 408, a parallel-to-serial converter 410, and a differential line driver 412. The packet stream generator 406 generates a packet stream from data provided by a component of the device for transmission, and includes a transmit buffer 414, a control character generator 416, an ordered sets generator 418, a multiplexer 420, and a packet control module 422. The transmit buffer 414 stores the data provided for transmission. The control character generator 416 outputs start characters, end characters, and other control characters. The ordered sets generator 418 provides characters for various types of ordered sets, including skip ordered sets, training ordered sets, electrical idle ordered sets, and the like. For example, under the PCIe specification, a skip ordered set is comprised of a COM character and one or more SKP characters, whereby each character is converted to a corresponding symbol for transmission over the physical link.

The packet control module 422 controls the multiplexer 420 so as to generate the packet stream by selecting between data characters from the transmit buffer 414, control characters from the control character generator 416, and ordered set characters from the ordered sets generator 418 to generate the symbols of the packet stream. Thus, in this embodiment the packet control module 422 controls the rate at which skip ordered sets are inserted into the packet stream, and thus ultimately into the transmitted data stream, through manipulation of the multiplexer 420.

To illustrate, the packet control module 422 can include timer device that is set to a specified duration based on the specified SOS insertion rate. When the timer device times out, it generates a request to transmit a SOS, and the packet control module 422 then acts as an arbiter to schedule the transmission of an SOS in response to the request. In this implementation, the controller for the timer device includes an input to receive the bypass indicator stored at the SOS bypass enable field 166 associated with the transmit port 402 for the device, and whereby controller for the timer device sets the timer duration for the timer device based on the bypass indicator so as to implement the SOS insertion rate indicated by the bypass indicator. As noted above, in some embodiments two or more levels of SOS rate insertion are implemented, such as a lower SOS insertion rate and a higher SOS insertion rate, or a zeroed SOS insertion rate (that is, SOS insertion disabled) and one or more non-zero SOS insertion rates (that is, SOS insertion enabled with either a lower insertion rate or a higher insertion rate). In this approach, the packet control module 422 can include logic to select between implementation of the two different SOS insertion rate levels based on the stored bypass indicator value.

The scrambler/encoder 408 scrambles and encodes the packets of the packet stream. To illustrate, per the PCIe 3.0 specification the scrambler/encoder 408 can include a 128b/130b encoder to encode every 128 bit datagram of the original packet stream into a 130 bit datagram, or per the PCIe 2.1 specification, the scrambler/encoder 408 can include an 8b/10b encoder to encode every 8 bit datagram into a 10 bit datagram. This encoding process can include the incorporation of clock information, such as incorporation of a local clock signal CLK_LCL (or a clock signal derived therefrom), into the resulting data stream using any of a variety of well-known clock embedding techniques, and thus allowing the clock information to be recovered on the receive side using any of a variety of well-known clock recovery techniques. The resulting encoded data stream is serialized by the parallel-to-serial converter 410 using the local clock signal CLK_LCL (or a clock signal derived therefrom) to generate a data stream and the resulting data stream is transmitted over a wire pair of a lane 424 of the interconnect using the differential line driver 412. The local clock signal CLK_LCL may be generated by a local clock source 430 (e.g., a crystal oscillator) or derived from a distributed clock signal REF_CLK via a phase locked loop (PLL) or other clock synchronization device. For example, the data processing system 100 can include a motherboard with PCIe expansion slots and the distributed clock signal REF_CLK can include, for example, a clock signal distributed across the motherboard to various PCIe expansion slots.

In the depicted example, the receive port 404 includes a differential receiver 432, a serial-to-parallel converter 434, a descrambler/decoder 436, an elastic buffer 438, a buffer controller 442, and a receive clock recovery module 444. The receive port 404 receives a transmitted data stream via the wire pair of a lane 446 coupled to the differential receiver 432, and provides the serialized data to the serial-to-parallel converter 434, which parallelizes the data into a stream of characters. The descrambler/decoder 436 descrambles or decodes the characters (e.g., converts from a 130 bit datagram to a 128 bit datagram, or from a 10 bit datagram to an 8 bit datagram), and buffers the resulting data in the elastic buffer 438 using a WRITE pointer (or head pointer), whereby the buffered data can be subsequently retrieved from the elastic buffer 438 using a READ pointer (or tail pointer) and provided to a component of the device for processing. The buffer controller 442 manages READ and WRITE pointers for the elastic buffer 438, and otherwise manages the use of the elastic buffer 438.

The transmit port of the opposing device connected to the lane 446, in some embodiments, encodes its local clock signal into the data stream as part of the 128b/130b or 8b/10b encoding process. The receiver clock recovery module 444 recovers this clock information from the data stream received via the lane 446 and provides the resulting recovered remote clock signal CLK_RX. Thus, the recovered remote clock signal CLK_RX is a proxy for, or otherwise having a frequency substantially equal to, the local clock signal used at the transmit side. As the serial-to-parallel converter 434 and the input of the elastic buffer 438 typically are synchronized to the transmit side, the recovered remote clock signal CLK_RX may be used by the serial-to-parallel converter 434 to convert the data stream, by the descrambler/decoder 436 to descramble or decode the characters output by the serial-to-parallel converter 434, and by the buffer control 442 to clock data into the elastic buffer 438. However, data typically is retrieved from the elastic buffer 438 using the local clock signal CLK_LCL of the interconnect interface 400. Thus, the elastic buffer 438 spans both the transmit-side clock domain (synchronized to the recovered remote clock signal CLK_RX) and the receive-side clock domain (synchronized to the local clock signal CLK_LCL).

As described above, the insertion of skip ordered sets into a data stream may be reduced or eliminated in the event that the devices at the opposing sides of the interconnect can otherwise compensate for the clock frequency mismatch. Typically, the clock frequency mismatch present in a lane is compensated for by the receive port of the lane. As such, the receiver port 404 of the interconnect interface 400 can employ various clock frequency mismatch compensation mechanisms to reduce or eliminate the impact of a clock frequency mismatch, and thereby enable the opposing transmit port to reduce or eliminate the insertion of skip ordered sets into the transmitted stream. For example, the receive port 404 can generate a clock signal (possibly employing a clock multiplier) that is faster than +300 ppm above the nominal bitrate clock for the interface, and this clock can be used to read data from the elastic buffer and feed the receiver's data path. Thus, with the receive port 404 clocked at a frequency higher than the local clock of the opposing transmit port, the receive port 404 can compensate for circumstances in which the frequency of the clock signal at the transmit port is higher than the frequency that would nominally be there using the local clock CLK_LCL (and thus the transmit-side bit rate would otherwise be higher than the receive-side bitrate). As another example, the descrambler/decoder 436 could be configured to perform the 128b/130b decoding or 8b/10b decoding using the recovered clock CLK_RX, which permits a bitrate mismatch margin of approximately 1.5% for 128b/130b decoding or 20% for 8b/10b decoding due to the 2 bit reduction in the resulting datagram Although two examples have been described, other clock frequency mismatch compensation techniques may be employed using the guidelines provided herein without departing from the scope of the present disclosure.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the configuration software described above. Further, in some embodiments, interconnect interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

FIG. 5 is a flow diagram illustrating an example method 500 for the design and fabrication of an IC device implementing one or more aspects of the devices disclosed herein. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink™, or MATLAB™.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively or in addition to synthesis, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In accordance with one aspect, a method of operating a system comprising a first device and a second device coupled via an interconnect includes setting a rate of insertion of clock mismatch compensation symbols for a transmit port of the first device to one of a plurality of rates of insertion responsive to the second device having a capability to compensate for a clock frequency mismatch. In one embodiment, the method further includes accessing a capability field of a capabilities structure of the second device, the capability field storing a value indicating whether the second device has the capability to compensate for the clock frequency mismatch. In one embodiment, the rate of insertion of clock mismatch compensation symbols for the transmit port is controlled by a bypass enable field of the of the first device, and setting the rate of insertion of clock mismatch compensation symbols for the transmit port comprises setting the bypass enable field to a first value to set the transmit port to a first rate of insertion responsive to the capability field storing a value indicating the second device has the capability to compensate for the clock frequency mismatch, and setting the bypass enable field to a second value to set the transmit port to a second rate of insertion responsive to the capability field storing a value indicating the second device does not have the capability to compensate for the clock frequency mismatch. The second rate of insertion is greater than the first rate of insertion. In one embodiment, the capability field indicates whether the second device is implementing spread spectrum clocking.

In one embodiment, the method further includes setting a rate of insertion of clock mismatch compensation symbols for a transmit port of the second device to one of the plurality of rates of insertion responsive to the first device having a capability to compensate for the clock frequency mismatch. The method further can include determining whether the first device has a capability to compensate for the clock frequency mismatch by accessing a first capability field of a capabilities structure of the first device, the first capability field storing a first value indicating whether the first device has the capability to compensate for the clock frequency mismatch and determining whether the second device has a capability to compensate for the clock frequency mismatch by accessing a second capability field of a capabilities structure of the second device, the second capability field storing a second value indicating whether the second device has the capability to compensate for the clock frequency mismatch.

In one embodiment, the rates of insertion of clock mismatch compensation symbols for the transmit ports of the first device and the second device are set to a first rate of insertion responsive to both the first device and the second device having the capability to compensate for the clock frequency mismatch and the rates of insertion of clock mismatch compensation symbols for the transmit ports of the first device and the second device are set to a second rate of insertion responsive to at least one of the first device and the second device not having have the capability to compensate for the clock frequency mismatch. The second rate of insertion is greater than the first rate of insertion. In one embodiment, setting the rate of insertion of clock mismatch compensation symbols for the transmit port comprises disabling insertion of clock mismatch compensation symbols by the transmit port. In one embodiment, the clock mismatch compensation symbols comprise skip ordered sets.

In accordance with another aspect of the present disclosure, a system comprises a first device comprising a first interconnect interface comprising a transmit port and a receive port and a configuration structure. The configuration structure comprises a first capability field to store a value indicating whether the first device has a capability to compensate for a clock frequency mismatch, and a bypass enable field. The device further includes a packet control module to configure a rate of insertion of clock mismatch compensation symbols by the transmit port into a data stream responsive to a value stored at the bypass enable field. In one embodiment, the first interconnect interface is compliant with at least one of: a Peripheral Component Interconnect Express (PCIe) specification; a Universal Serial Bus (USB) specification; a DisplayPort specification; an Infiniband specification; and a Thunderbolt specification.

In one embodiment, the packet control module is to configure the rate of insertion of clock mismatch compensation symbols to a first rate of insertion responsive to the bypass enable field storing a first value, and configure the rate of insertion of clock mismatch compensation symbols to a second rate of insertion responsive to the bypass enable field storing a second value. In one embodiment, the packet control module is to configure the rate of insertion of clock mismatch compensation symbols to the second rate of insertion by disabling insertion of clock mismatch compensation symbols into the data stream.

In one embodiment, the system further includes an interconnect coupled to the first interconnect interface, a second device comprising a second interconnect interface coupled to the interconnect, a processor coupled to the first device, and a computer readable medium storing a set of executable instructions. The set of executable instructions are to manipulate the processor to determine whether the second device has the capability to compensate for the clock frequency mismatch and set the bypass enable field to a first value responsive to the second device having the capability to compensate for the clock frequency mismatch. In one embodiment, the set of executable instructions further are to manipulate the processor to set the bypass enable field to a second value responsive to the second device not having have the capability to compensate for the clock frequency mismatch. In one embodiment, the packet control module is to configure the rate of insertion of clock mismatch compensation symbols to a first rate of insertion responsive to the bypass enable field storing the first value and configure the rate of insertion of clock mismatch compensation symbols to a second rate of insertion responsive to the bypass enable field storing the second value, the second rate of insertion greater than the first rate of insertion.

In accordance with yet another aspect, a computer readable medium embodies a set of executable instructions, the set of executable instructions to manipulate at least one processor to set a rate of insertion of clock mismatch compensation symbols for a transmit port of a first device to one of a plurality of rates of insertion responsive to a second device having a capability to compensate for a clock frequency mismatch, the first device and second device connected via an interconnect. In one embodiment, the executable instructions to manipulate the at least one processor to determine whether the second device has the capability to compensate for the clock frequency mismatch comprise executable instructions to manipulate the at least one processor to: access a capability field of a capabilities structure of the second device, the capability field storing a value indicating whether the second device has the capability to compensate for the clock frequency mismatch. In one embodiment, the set of executable instructions further is to manipulate the at least one processor to set a rate of insertion of clock mismatch compensation symbols for a transmit port of the second device to one of the plurality of rates of insertion responsive to the first device having a capability to compensate for the clock frequency mismatch.

In one embodiment, the rate of insertion of clock mismatch compensation symbols for the transmit port is controlled by a bypass enable field of the first device and the executable instructions to manipulate the at least one processor to set the rate of insertion of clock mismatch compensation symbols for the transmit port comprise executable instructions to manipulate the at least one processor to set the bypass enable field to a first value to set the transmit port to a first rate of insertion responsive to the capability field storing a value indicating the second device has the capability to compensate for the clock frequency mismatch, and set the bypass enable field to a second value to set the transmit port to a second rate of insertion responsive to the capability field storing a value indicating the second device does not have the capability to compensate for the clock frequency mismatch. The second rate of insertion is greater than the first rate of insertion.

In one embodiment, the set of executable instructions includes executable instructions to manipulate the at least one processor to determine whether the first device has a capability to compensate for the clock frequency mismatch comprises by accessing a first capability field of a capabilities structure of the first device, the first capability field storing a first value indicating whether the first device has the capability to compensate for the clock frequency mismatch and determine whether the second device has a capability to compensate for the clock frequency mismatch comprises by accessing a second capability field of a capabilities structure of the second device, the second capability field storing a second value indicating whether the second device has the capability to compensate for the clock frequency mismatch.

In one embodiment, the rates of insertion of clock mismatch compensation symbols for the transmit ports of the first device and the second device are set to a first rate of insertion responsive both the first device and the second device having the capability to compensate for the clock frequency mismatch; and the rates of insertion of clock mismatch compensation symbols for the transmit ports of the first device and the second device are set to a second rate of insertion responsive to at least one of the first device and the second device not having have the capability to compensate for the clock frequency mismatch. In one embodiment, the executable instructions to manipulate the at least one processor to set the rate of insertion of clock mismatch compensation symbols for the transmit port of the first device comprise executable instructions to manipulate the at least one processor to disable insertion of clock mismatch compensation symbols by the transmit port.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any features that may cause any benefit, advantage, or solution to occur or become more pronounced are not to be construed as a critical, required, or essential feature of any or all the claims.

What is claimed is:

1. A method of operating a system comprising a first device and a second device coupled via an interconnect, the method comprising:
   accessing a capability field of a capabilities structure of the second device, the capability field storing a value indicating whether the second device has the capability to compensate for a clock frequency mismatch; and
   setting a rate of insertion of clock mismatch compensation symbols for a transmit port of the first device to one of a plurality of rates of insertion responsive to the second device having a capability to compensate for a clock frequency mismatch;
   wherein:
      the rate of insertion of clock mismatch compensation symbols for the transmit port is controlled by a bypass enable field of the of the first device; and
      setting the rate of insertion of clock mismatch compensation symbols for the transmit port comprises:
         setting the bypass enable field to a first value to set the transmit port to a first rate of insertion responsive to the capability field storing a value indicating the second device has the capability to compensate for the clock frequency mismatch; and setting the bypass enable field to a second value to set the transmit port to a second rate of insertion responsive to the capability field storing a value indicating the second device does not have the capability to compensate for the clock frequency mismatch; and the second rate of insertion is greater than the first rate of insertion.

2. The method of claim 1, wherein setting the rate of insertion of clock mismatch compensation symbols for the transmit port comprises disabling insertion of clock mismatch compensation symbols by the transmit port.

3. The method of claim 1, wherein the clock mismatch compensation symbols comprise skip ordered sets.

4. A method of operating a system comprising a first device and a second device coupled via an interconnect, the method comprising:

accessing a capability field of a capabilities structure of the second device, the capability field storing a value indicating whether the second device has the capability to compensate for a clock frequency mismatch;

setting a rate of insertion of clock mismatch compensation symbols for a transmit port of the first device to one of a plurality of rates of insertion responsive to the second device having a capability to compensate for a clock frequency mismatch; and setting a rate of insertion of clock mismatch compensation symbols for a transmit port of the second device to one of the plurality of rates of insertion responsive to the first device having a capability to compensate for the clock frequency mismatch.

5. The method of claim 4, wherein:
the capability field indicates whether the second device is implementing spread spectrum clocking.

6. The method of claim 4, further comprising:
determining whether the first device has a capability to compensate for the clock frequency mismatch by accessing a first capability field of a capabilities structure of the first device, the first capability field storing a first value indicating whether the first device has the capability to compensate for the clock frequency mismatch; and determining whether the second device has a capability to compensate for the clock frequency mismatch by accessing a second capability field of a capabilities structure of the second device, the second capability field storing a second value indicating whether the second device has the capability to compensate for the clock frequency mismatch.

7. The method of claim 4, wherein:
the rates of insertion of clock mismatch compensation symbols for the transmit ports of the first device and the second device are set to a first rate of insertion responsive to both the first device and the second device having the capability to compensate for the clock frequency mismatch; and the rates of insertion of clock mismatch compensation symbols for the transmit ports of the first device and the second device are set to a second rate of insertion responsive to at least one of the first device and the second device not having have the capability to compensate for the clock frequency mismatch; and the second rate of insertion is greater than the first rate of insertion.

8. The method of claim 4, wherein the clock mismatch compensation symbols comprise skip ordered sets.

9. A system comprising:
a first device comprising:
a first interconnect interface comprising a transmit port and a receive port to couple to a second device;
a configuration structure comprising:
a first capability field to store a value indicating whether the first device has a capability to compensate for a clock frequency mismatch; and
a bypass enable field; and
a packet control module to configure a rate of insertion of clock mismatch compensation symbols by the transmit port into a data stream responsive to a value stored at the bypass enable field;
a processor coupled to the first device; and
a non-transitory computer readable medium storing a set of executable instructions, the set of executable instructions to manipulate the processor to:
set the bypass enable field to a first value to set the transmit port to a first rate of insertion responsive to a second capability field of the second device storing a value indicating the second device has the capability to compensate for the clock frequency mismatch; and
set the bypass enable field to a second value to set the transmit port to a second rate of insertion responsive to the second capability field storing a value indicating the second device does not have the capability to compensate for the clock frequency mismatch; and
wherein the second rate of insertion is greater than the first rate of insertion.

10. The system of claim 9, wherein the packet control module is to configure the rate of insertion of clock mismatch compensation symbols to the second rate of insertion by disabling insertion of clock mismatch compensation symbols into the data stream.

11. The system of claim 9, wherein the first interconnect interface is compliant with at least one of: a Peripheral Component Interconnect Express (PCIe) specification; a Universal Serial Bus (USB) specification; a DisplayPort specification; an Infiniband specification; and a Thunderbolt specification.

12. The system of claim 9, wherein the clock mismatch compensation symbols comprise skip ordered sets.

13. A system comprising:
a first device comprising:
a first interconnect interface comprising a transmit port and a receive port;
a configuration structure comprising:
a first capability field to store a value indicating whether the first device has a capability to compensate for a clock frequency mismatch; and
a bypass enable field; and
a packet control module to configure a rate of insertion of clock mismatch compensation symbols by the transmit port into a data stream responsive to a value stored at the bypass enable field;
an interconnect coupled to the first interconnect interface;
a second device comprising a second interconnect interface coupled to the interconnect;
a processor coupled to the first device; and
a non-transitory computer readable medium storing a set of executable instructions, the set of executable instructions to manipulate the processor to:
determine whether the second device has the capability to compensate for the clock frequency mismatch; and
set the bypass enable field to a first value responsive to the second device having the capability to compensate for the clock frequency mismatch and set the bypass enable field to a second value responsive to the second device not having the capability to compensate for the clock frequency mismatch; and wherein the packet control module is to:
configure the rate of insertion of clock mismatch compensation symbols to a first rate of insertion responsive to the bypass enable field storing the first value; and
configure the rate of insertion of clock mismatch compensation symbols to a second rate of insertion responsive to the bypass enable field storing the second value, the second rate of insertion greater than the first rate of insertion.

14. The system of claim 13, wherein the clock mismatch compensation symbols comprise skip ordered sets.

15. A non-transitory computer readable medium embodying a set of executable instructions, the set of executable instructions to manipulate at least one processor to:
access a capability field of a capabilities structure of a second device, the capability field storing a value indicating whether the second device has the capability to compensate for a clock frequency mismatch;
set a rate of insertion of clock mismatch compensation symbols for a transmit port of a first device to one of a plurality of rates of insertion responsive to a second device having a capability to compensate for a clock frequency mismatch, the first device and second device connected via an interconnect; and
set a rate of insertion of clock mismatch compensation symbols for a transmit port of the second device to one of the plurality of rates of insertion responsive to the first device having a capability to compensate for the clock frequency mismatch.

16. The non-transitory computer readable medium of claim 15, wherein:
the rate of insertion of clock mismatch compensation symbols for the transmit port is controlled by a bypass enable field of the first device; and
the executable instructions to manipulate the at least one processor to set the rate of insertion of clock mismatch compensation symbols for the transmit port comprise executable instructions to manipulate the at least one processor to:
set the bypass enable field to a first value to set the transmit port to a first rate of insertion responsive to the capability field storing a value indicating the second device has the capability to compensate for the clock frequency mismatch; and
set the bypass enable field to a second value to set the transmit port to a second rate of insertion responsive to the capability field storing a value indicating the second device does not have the capability to compensate for the clock frequency mismatch; and the second rate of insertion is greater than the first rate of insertion.

17. The non-transitory computer readable medium of claim 15, wherein the set of executable instructions includes executable instructions to manipulate the at least one processor to:
determine whether the first device has a capability to compensate for the clock frequency mismatch comprises by accessing a first capability field of a capabilities structure of the first device, the first capability field storing a first value indicating whether the first device has the capability to compensate for the clock frequency mismatch; and
determine whether the second device has a capability to compensate for the clock frequency mismatch comprises by accessing a second capability field of a capabilities structure of the second device, the second capability field storing a second value indicating whether the second device has the capability to compensate for the clock frequency mismatch.

18. The non-transitory computer readable medium of claim 17, wherein:
the rates of insertion of clock mismatch compensation symbols for the transmit ports of the first device and the second device are set to a first rate of insertion responsive both the first device and the second device having the capability to compensate for the clock frequency mismatch; and
the rates of insertion of clock mismatch compensation symbols for the transmit ports of the first device and the second device are set to a second rate of insertion responsive to at least one of the first device and the second device not having have the capability to compensate for the clock frequency mismatch; and
the second rate of insertion is greater than the first rate of insertion.

19. The non-transitory computer readable medium of claim 15, wherein the executable instructions to manipulate the at least one processor to set the rate of insertion of clock mismatch compensation symbols for the transmit port of the first device comprise executable instructions to manipulate the at least one processor to disable insertion of clock mismatch compensation symbols by the transmit port.

20. The non-transitory computer readable medium of claim 15, wherein the clock mismatch compensation symbols comprise skip ordered sets.

* * * * *